(12) United States Patent
Jung et al.

(10) Patent No.: US 10,372,244 B2
(45) Date of Patent: Aug. 6, 2019

(54) TOUCH SCREEN DEVICE

(71) Applicant: LG DISPLAY CO., LTD., Seoul (KR)

(72) Inventors: DoYoung Jung, Seoul (KR); SungChul Kim, Goyang-si (KR); SangHyuck Bae, Paju-si (KR); Sungsu Han, Goyang-si (KR); Suyun Ju, Gangwon-do (KR)

(73) Assignee: LG DISPLAY CO., LTD., Seoul (KR)

( * ) Notice: Subject to any disclaimer, the term of this patent is extended or adjusted under 35 U.S.C. 154(b) by 146 days.

(21) Appl. No.: 14/961,371

(22) Filed: Dec. 7, 2015

(65) Prior Publication Data

US 2016/0188007 A1 Jun. 30, 2016

(30) Foreign Application Priority Data

Dec. 31, 2014 (KR) .................. 10-2014-0196047

(51) Int. Cl.
*G06F 3/038* (2013.01)
*G06F 3/041* (2006.01)
*G06F 3/0354* (2013.01)
*G06F 3/044* (2006.01)

(52) U.S. Cl.
CPC ............ *G06F 3/0383* (2013.01); *G06F 3/038* (2013.01); *G06F 3/03545* (2013.01); *G06F 3/044* (2013.01); *G06F 3/0412* (2013.01); *G06F 3/0414* (2013.01); *G06F 3/0416* (2013.01)

(58) Field of Classification Search
CPC .. G06F 3/0383; G06F 3/0414; G06F 3/03545; G06F 3/044; G06F 3/038; G06F 3/0412; G06F 3/0416
See application file for complete search history.

(56) References Cited

U.S. PATENT DOCUMENTS

| | | | |
|---|---|---|---|
| 9,262,025 B2* | 2/2016 | Yu | G06F 3/044 |
| 9,285,900 B2* | 3/2016 | Rhee | G06F 3/0383 |
| 9,557,834 B2* | 1/2017 | Hamaguchi | G06F 3/0416 |
| 10,019,079 B2* | 7/2018 | Peretz | G06F 3/041 |
| 2008/0129709 A1* | 6/2008 | Lin | G06F 3/03545 |
| | | | 345/179 |
| 2010/0051356 A1* | 3/2010 | Stern | G06F 3/03545 |
| | | | 178/19.04 |
| 2011/0090146 A1* | 4/2011 | Katsurahira | G06F 3/03545 |
| | | | 345/156 |
| 2012/0105362 A1* | 5/2012 | Kremin | G06F 3/03545 |
| | | | 345/174 |
| 2012/0154340 A1* | 6/2012 | Vuppu | G06F 3/044 |
| | | | 345/179 |

(Continued)

FOREIGN PATENT DOCUMENTS

| | | |
|---|---|---|
| CN | 104238778 A | 12/2014 |
| KR | 10-2014-0083214 A | 7/2014 |

(Continued)

*Primary Examiner* — Kenneth Bukowski
(74) *Attorney, Agent, or Firm* — Dentons US LLP

(57) ABSTRACT

Disclosed is a touch screen device for transmitting pressure information based on a touch pen without a separate sensor being provided in a touch panel. The touch screen device includes a touch screen and a touch pen transmitting a pen output signal to the touch screen. The touch pen adjusts the pen output signal according to pressure which is applied thereto when the touch pen contacts the touch screen.

7 Claims, 6 Drawing Sheets

(56) References Cited

U.S. PATENT DOCUMENTS

| | | | |
|---|---|---|---|
| 2013/0106722 A1* | 5/2013 | Shahparnia | G06F 3/03545 345/173 |
| 2014/0078101 A1* | 3/2014 | Katsurahira | G06F 3/044 345/174 |
| 2014/0160088 A1* | 6/2014 | Mercea | G06F 1/3259 345/179 |
| 2014/0176495 A1* | 6/2014 | Vlasov | G06F 3/03545 345/174 |
| 2015/0002415 A1* | 1/2015 | Lee | G06F 3/03545 345/173 |
| 2015/0160782 A1* | 6/2015 | Park | G06F 3/0418 345/174 |
| 2015/0193025 A1* | 7/2015 | Rebeschi | G06F 3/03545 345/174 |
| 2016/0041681 A1* | 2/2016 | Hamaguchi | G06F 3/044 345/174 |
| 2016/0117019 A1* | 4/2016 | Takeda | G06F 3/03 345/174 |
| 2017/0060278 A1* | 3/2017 | Jung | G06F 3/03545 |
| 2017/0131798 A1* | 5/2017 | Geaghan | G06F 3/03545 |
| 2017/0308185 A1* | 10/2017 | Eguchi | G06F 3/046 |

FOREIGN PATENT DOCUMENTS

| | | |
|---|---|---|
| KR | 10-2014-0085995 A | 7/2014 |
| KR | 10-2014-0105216 A | 9/2014 |
| WO | 2014/188973 A1 | 11/2014 |

\* cited by examiner

TOUCH SCREEN DEVICE

CROSS-REFERENCE TO RELATED APPLICATIONS

This application claims the benefit of the Korean Patent Application No. 10-2014-0196047 filed on Dec. 31, 2014, which is hereby incorporated by reference as if fully set forth herein.

BACKGROUND

1. Field of the Invention

The present invention relates to a touch screen device. More particularly, the present invention relates to a touch screen device for transmitting pressure information based on a touch pen without a separate sensor being provided in a touch panel.

2. Discussion of the Related Art

Examples of flat panel display devices, which display an image by using digital data, include liquid crystal display (LCD) devices using liquid crystal, plasma display panels (PDPs) using discharging of an inert gas, organic light emitting diode (OLED) display devices using OLEDs, etc.

Touch screen devices, which are each implemented with a touch panel added into a flat panel display device, are being produced. Examples of the touch screen devices include smartphones, smart books, etc. In the touch screen devices, writing or drawing may be performed using a touch pen as well as a human touch performed by a finger. A touch input using the touch pen is more precise than an input corresponding to the human touch and thus enables precise writing and drawing to be easily performed.

In a related art touch screen device, a plurality of electrodes or sensors are separately provided in a touch panel so as to recognize a touch performed by a touch pen and to transmit pressure information based on the touch pen. Particularly, when a touch panel is implemented as one body with a display panel, a plurality of electrodes and sensors are further provided, and for this reason, a manufacturing process becomes complicated, and the manufacturing cost increases.

SUMMARY

Accordingly, the present invention is directed to a touch screen device that substantially obviates one or more problems due to limitations and disadvantages of the related art.

An aspect of the present invention is directed to a touch screen device for transmitting pressure information based on a touch pen without a separate sensor being provided in a touch panel.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a touch screen device including a touch screen and a touch pen transmitting a pen output signal to the touch screen, wherein the touch pen adjusts the pen output signal according to pressure which is applied thereto when the touch pen contacts the touch screen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, an example of a touch screen device according to an embodiment of the present invention will be described in detail with reference to the accompanying drawings.

The touch pen according to the embodiments of the present invention is proposed to be applied to a capacitive touch screen device proposed by the applicant. For example, the present invention is proposed in order for an active touch pen to be applied to an in-cell type touch screen device disclosed in Korean Patent Publication Nos. 10-2014-0105216, 10-2014-0085995, and 10-2014-0083214 proposed by the applicant. That is, in a capacitance type, embodiments of the present invention are not limited to a structure of a touch electrode and a touch sensing method. Hereinafter, for convenience of description, embodiments of the present invention will be described based on the touch screen devices disclosed in the above-described reference documents.

Figure 1:
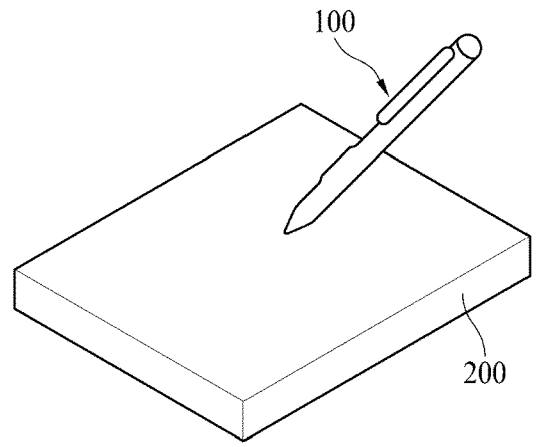
FIG. 1 is a diagram schematically illustrating a configuration of a touch screen device according to an embodiment of the present invention.

FIG. 1 is a diagram schematically illustrating a configuration of a touch screen device according to an embodiment of the present invention.

Referring to FIG. 1, the touch screen device according to an embodiment of the present invention may include a display panel 200, which has a display function and a detection function, and a touch pen 100 that performs a touch detection function according to a specific area being touched.

The display panel 200 may detect a touch which is performed by a finger in addition to the touch pen 100, and may include a capacitive touch screen integrated into the display panel 200. The touch screen may include a touch electrode (or a touch line) which is disposed on a glass substrate and is a separate element. Also, the touch screen may be implemented in an in-cell type where a touch detection electrode and a connection line thereof are formed in a process of forming a pixel array which is used for the display panel 200 to display a screen. In the in-cell type, a supporting substrate may be omitted, and thus, the finished display panel 200 may have the almost same thickness and weight as those of a display panel having an original screen display function.

The display panel 200 may be one of a liquid crystal panel, a field emission display panel, a plasma display panel, an OLED display panel, an electrophoresis display panel, etc. In embodiments to be described below, the liquid crystal panel will be described. When the display panel 200 is implemented as the liquid crystal panel, a plurality of electrodes configuring a touch screen may be formed simultaneously with a process of forming a line of the liquid crystal panel.

According to the embodiments of the present invention, a conductive tip of the touch pen may be used as an element that receives a touch electrode driving signal of the touch screen. Also, the conductive tip may be used as an element that transmits a pen output signal generated in the touch pen. Also, the touch pen may output the pen output signal in synchronization with the touch electrode driving signal of the touch screen which is received by the touch pen.

Therefore, according to the embodiments of the present invention, whether a touch is performed by the touch pen is accurately detected in the driving period of the touch screen, and thus, an accuracy of touch detection increases. Accordingly, it is possible to implement a high-sensitivity input pen. Also, a linearity of touch detection is maintained, and thus, touch performance is enhanced. Also, although a separate electrode for driving the touch pen is not added into the display panel, a high sensation of touch sensing is maintained, and thus, a structure is simplified.

The touch pen according to an embodiment of the present invention will be described below with reference to FIGS. 7 to 9.

Figure 2:
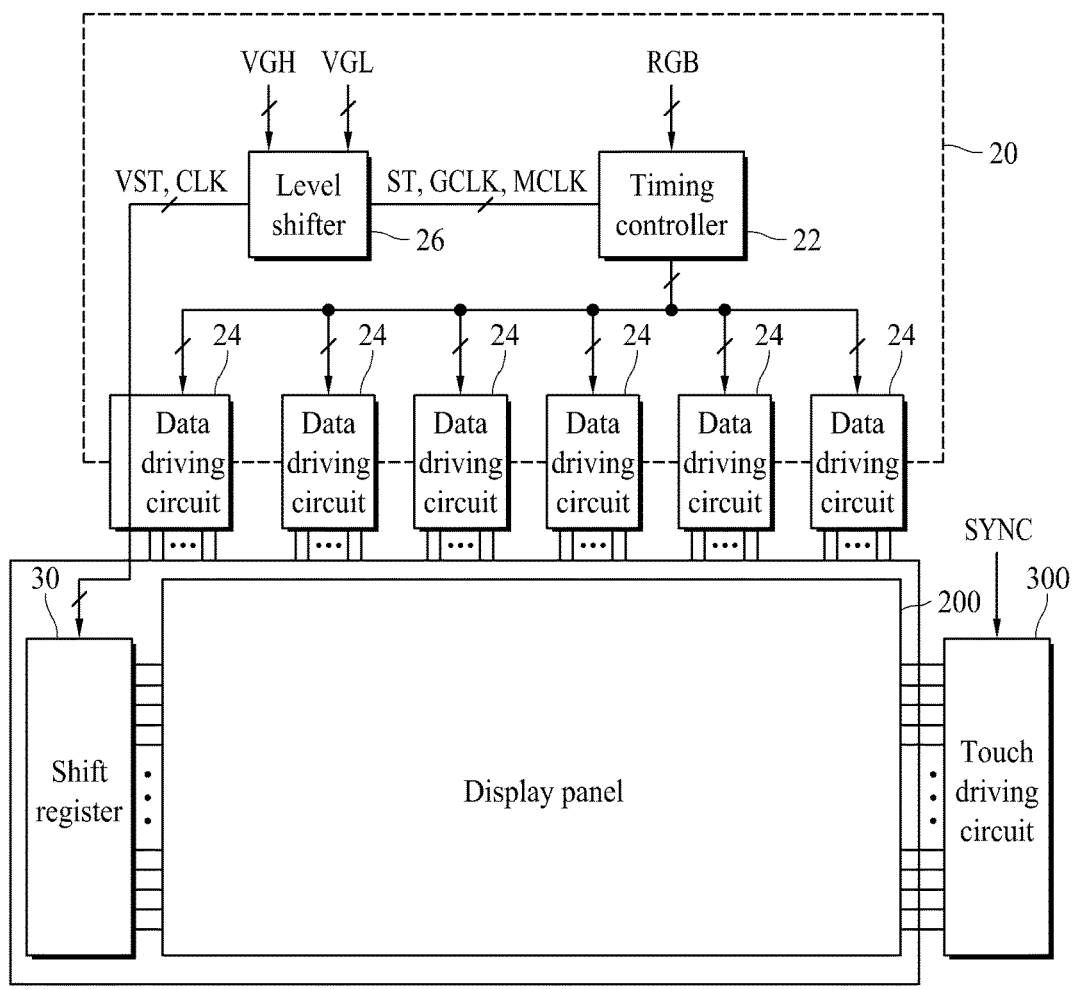
FIG. 2 is a block diagram illustrating a display panel of the touch screen device according to an embodiment of the present invention and a controller thereof.

FIG. 2 is a block diagram illustrating a display panel of the touch screen device according to an embodiment of the present invention and a controller thereof.

Referring to FIG. 2, the display panel 200 of the touch screen device according to an embodiment of the present invention may be connected to a gate driving circuit 26 (30) and a data driving circuit 24 which are included in a pixel array driving circuit. Also, the display panel 200 may be connected to a touch driving circuit 300 that is a touch screen driving circuit. The pixel array driving circuit and the touch screen driving circuit may be connected to a timing controller 22 and may be integrated into a single module (not shown).

When the display panel 200 is the liquid crystal panel, the display panel 200 may include a liquid crystal layer disposed between two substrates. The substrates may each be manufactured as a glass substrate, a plastic substrate, a film substrate, or the like. A pixel array disposed on a lower substrate of the display panel 200 may include a plurality of data lines, a plurality of gate lines intersecting the data lines, and a plurality of pixels which are arranged in a matrix type. The pixel array may further include a plurality of thin film transistors (TFTs) which are respectively formed in the plurality of pixels defined by intersections of the data lines and the gate lines, a plurality of pixel electrodes for respectively charging the plurality of pixels with data voltages, and a plurality of storage capacitors which are respectively connected to the plurality of pixel electrodes to hold respective pixel voltages.

The pixels of the display panel 200 may be respectively provided in a plurality of pixel areas defined by the data lines (D1 to Dm) and the gate lines (G1 to Gn) and may be arranged in the matrix type. A liquid crystal cell of each of the pixels may adjust a transmission amount of incident light according to a voltage difference between a data voltage applied to a corresponding pixel electrode and a common voltage applied to a corresponding common electrode. Each of the TFTs may be turned on in response to a gate pulse supplied through a corresponding gate line and may supply a data voltage, supplied through a corresponding data line, to a pixel electrode of a corresponding liquid crystal cell. The common electrode may be disposed on a lower substrate or an upper substrate.

The upper substrate of the display panel 200 may include a black matrix, a color filter, etc. A polarizer may be attached to each of the upper substrate and the lower substrate of the display panel 200, and an alignment layer for adjusting a pre-tilt angle of liquid crystal may be disposed on an inner surface contacting the liquid crystal. A spacer for maintaining a cell gap of the liquid crystal cell may be disposed between the upper substrate and the lower substrate of the display panel 200.

The display panel 200 may be implemented in a well-known liquid crystal mode such as a twisted nematic (TN)

mode, a vertical alignment (VA) mode, an in-plane switching (IPS) mode, a fringe field switching (FFS) mode, or the like.

A backlight unit may be optionally disposed on a rear surface of the display panel 200. The backlight unit may be implemented as an edge type backlight unit or a direct type backlight unit and may irradiate light onto the display panel 200.

The data driving circuit 24 may convert digital video data RGB, input from the timing controller 22, into analog positive/negative gamma compensation voltages to generate data voltages. The data driving circuit 24 may respectively supply the data voltages to the data lines according to control by the timing controller 22 and may invert polarities of the data voltages.

The gate driving circuit 26 (30) may sequentially supply the gate pulse (or a scan pulse), synchronized with the data voltages, to the gate lines to select lines of the display panel 200 in which the data voltages are respectively written. The gate driving circuit 26 (30) may include a level shifter 26 and a shift register 30. The shift register 30 may be directly provided on the substrate of the display panel 200 in a gate-in panel (GIP) type.

The level shifter 26 may be provided on a printed circuit board (PCB) 20 electrically connected to the lower substrate of the display panel 200. The level shifter 26 may output clock signals that swing between a gate high voltage VGH and a gate low voltage VGL according to control by the timing controller 22. The gate high voltage VGH may be set as a voltage equal to or higher than a threshold voltage of a thin film transistor (TFT) which is formed in the pixel array of the display panel 200. The gate low voltage VGL may be set as a voltage lower than the threshold voltage of the TFT which is formed in the pixel array of the display panel 200. The level shifter 26 may output a start pulse VST and a clock signal CLK which swing between the gate high voltage VGH and the gate low voltage VGL in response to a reference start signal ST, a first clock GCLK, and a second clock MCLK which are input from the timing controller 22. Phases of the clock signals CLK output from the level shifter 26 may be sequentially shifted, and the phase-shifted clock signals CLK may be transferred to a shift register 30 which is provided in the display panel 200.

The shift register 30 may start to perform synchronization in response to the start pulse VST input from the level shifter 26, shift an output in response to the clock signals CLK, and sequentially supply the gate pulse to the gate lines of the display panel 200.

The timing controller 22 may supply digital video data RGB, input from an external host system, to a plurality of integrated circuits (ICs) included in the data driving circuit 24. The timing controller 22 may receive timing signals such as a vertical sync signal Vsync, a horizontal sync signal Hsync, a data enable signal DE, and a clock to generate a plurality of timing control signals for controlling operation timings of the data driving circuit 24 and the gate driving circuit 26 (30). The timing controller 22 or the host system may generate a sync signal SYNC for controlling operation timings of a pixel array driving circuit and the touch driving circuit 300.

The touch driving circuit 300 may apply the touch electrode driving signal to a plurality of touch electrodes (or lines) and may count a driving signal voltage change of after and before a touch is performed, or may count a rising or falling edge delay time of a driving signal, thereby sensing a capacitance change. The touch driving circuit 300 may convert sensing data, received from a capacitance of the touch screen, into digital data to output touch raw data. Also, the touch driving circuit 300 may execute a predetermined touch recognition algorithm and may analyze the touch raw data to detect a touch (or proximity) input.

Figure 3:
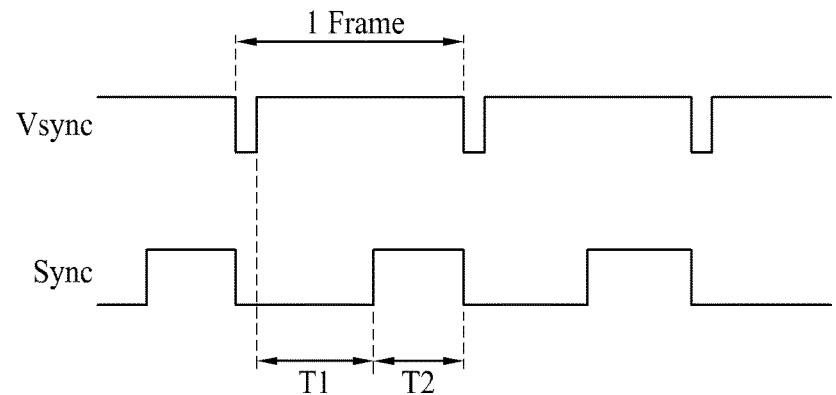
FIG. 3 is a waveform diagram showing time-division driving of the display panel included in the touch screen device according to an embodiment of the present invention.

FIG. 3 is a waveform diagram showing time-division driving of the display panel included in the touch screen device according to an embodiment of the present invention.

As shown in FIG. 3, the display panel 200 and the touch screen may be time-division driven. That is, one frame period may be time-divided into a pixel array driving period T1 and a touch screen driving period T2.

Vsync refers to a first vertical sync signal which is input to the timing controller 22, and SYNC refers to a second vertical sync signal which is input to the touch driving circuit 300. The timing controller 22 may modulate the first vertical sync signal Vsync input from the host system to generate the second vertical sync signal SYNC, for defining the pixel array driving period T1 and the touch screen driving period T2 in one frame period. Alternatively, the host system may generate the second vertical sync signal SYNC, and the timing controller 22 may control the pixel array driving period T1 and the touch screen driving period T2 in response to the second vertical sync signal SYNC input from the host system. That is, one of the timing controller 22 and the host system may time-divide the one frame period into the pixel array driving period T1 and the touch screen driving period T2 to control the operation timings of the pixel array driving circuit and the touch driving circuit 300.

For example, when it is assumed that the display panel 200 is driven at a frequency of 60 Hz, 1/60 sec may be one frame period, which may be divided into the pixel array driving period T1 and the touch screen driving period T2. As described above, the reason that pixel array driving and touch screen driving are time-division performed is because when the pixel array and the touch screen are driven at the same time, a displayed screen is not uniform due to severe driving interference therebetween, or an accuracy of touch detection is lowered.

During the pixel array driving period T1, the data driving circuit 24 may respectively supply data voltages to the data lines according to control by the timing controller 22, and the gate driving circuit 26 (30) may sequentially supply the gate pulse, synchronized with the data voltages, to the gate lines. The touch driving circuit 300 may not supply the touch electrode driving signal to the touch electrodes during the pixel array driving period T1.

Moreover, during the touch screen driving period T2, the pixel array driving circuit may not be driven, and the touch driving circuit 300 may be driven. Therefore, during the touch screen driving period T2, the touch driving circuit 300 may supply the touch electrode driving signal to the touch electrodes to detect a position of a touch (or proximity) input.

Figure 4A:
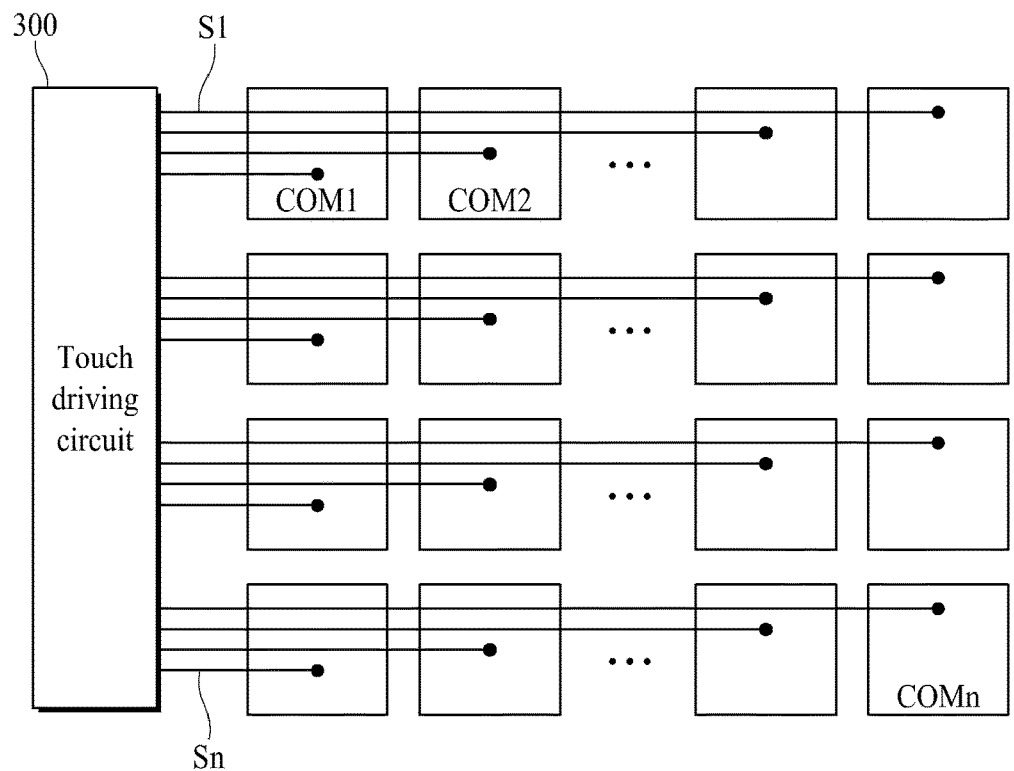
FIGS. 4A and 4B are block diagrams illustrating in detail a touch screen of the touch screen device according to an embodiment of the present invention and a touch controller thereof.
Figure 4B:
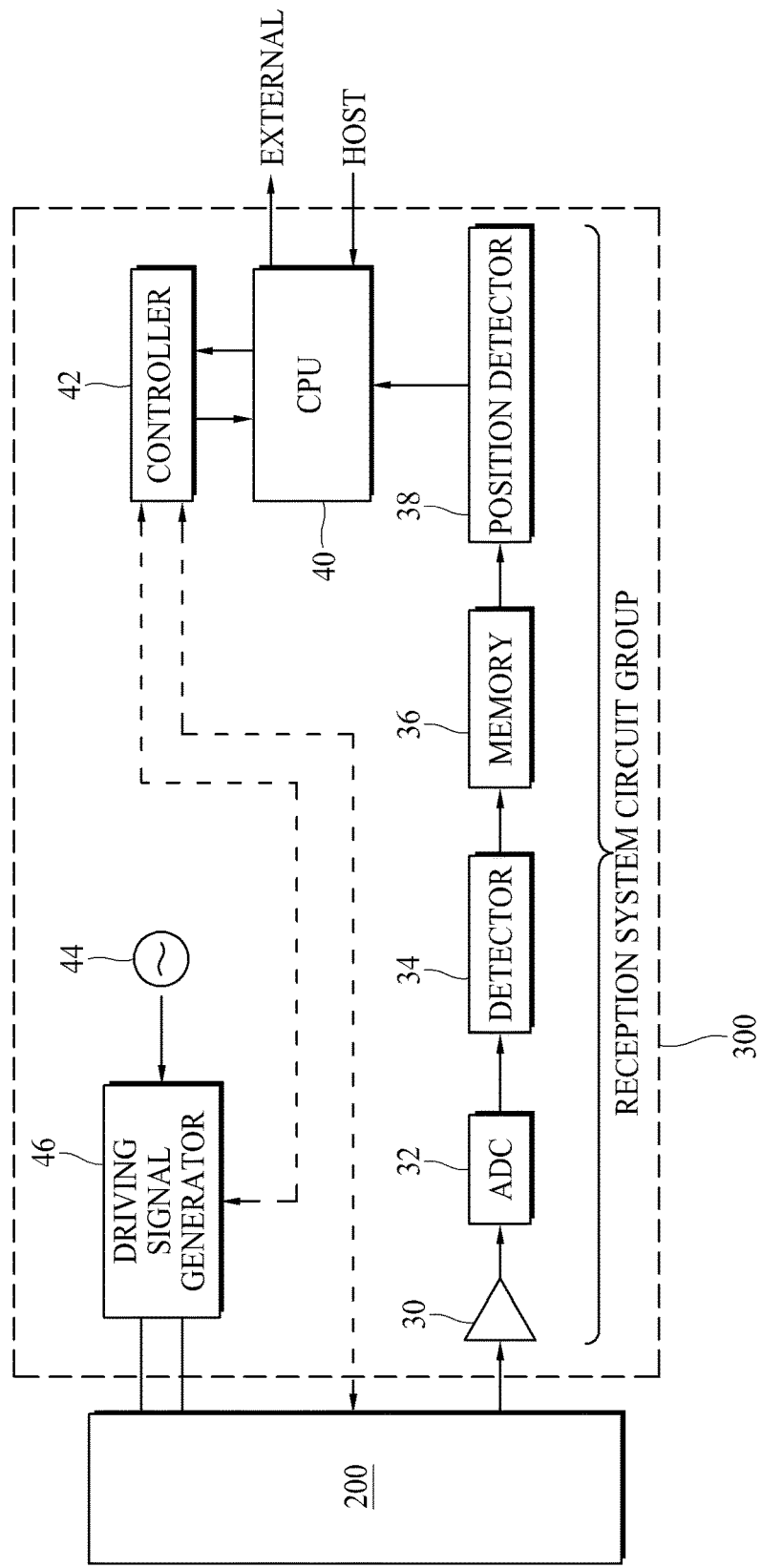

FIGS. 4A and 4B are block diagrams illustrating in detail a touch screen of the touch screen device according to an embodiment of the present invention and a touch controller thereof.

As illustrated in FIG. 4A, in the touch screen of the touch screen device according to an embodiment of the present invention, a plurality of touch electrodes COM1 to COMn for detecting a position of an input tool may be provided in the display panel 200 in an in-cell type.

For example, when the display panel 200 is a liquid crystal panel where a pixel array is included in a lower substrate and a color filter array is included in an upper substrate, the touch electrodes may be provided on the lower substrate along with the pixel array, or may be provided on the color filter array. Also, the touch electrodes may be used by patterning a common electrode which is formed on the lower substrate or the upper substrate. For example, if touch electrodes COM1 to COMn are formed by patterning the common electrode, a common voltage may be uniformly applied to the touch electrodes in order for the touch electrodes to act as the common electrode in pixel array driving.

The touch electrodes COM1 to COMn may be connected to a plurality of sensing lines S1 to Sn in one-to-one correspondence relationship, and the sensing lines S1 to Sn may be connected to the touch driving circuit 300.

The touch driving circuit 300, as illustrated in FIG. 4B, may include a reception system circuit group which includes a reception amplifier 30, an analog-to-digital conversion circuit 32, a detector 34, a memory 36, and a position calculator 38.

Moreover, the reception system circuit group may be connected to a central processing unit (CPU) 40 connected to an external host. Also, the CPU 40 may be connected to a controller 42 that overall controls a touch operation, and the controller 42 may be connected to a driving signal generator 46, whereby a touch electrode driving signal Ts generated by an oscillator 44 may be supplied to the touch electrodes COM1 to COMn through the sensing lines S1 to Sn.

A touch screen illustrated in the drawing may have a self-capacitance type, and the touch electrodes COM1 to COMn may be used for all of a driving signal applying operation and a reception signal detecting operation.

A size of each of the touch electrodes COM1 to COMn may be larger than that of each of a plurality of pixels, and for example, each of the touch electrodes COM1 to COMn may be formed in a size overlapping a plurality of pixels. Also, the touch electrodes COM1 to COMn may each be formed of a transparent conductive material and thus do not reduce an aperture ratio during a display period of pixel array driving.

A common voltage source (not shown) may supply a common voltage Vcom to the touch electrodes COM1 to COMn through the sensing lines S1 to Sn during the pixel array driving period T1. Therefore, the touch electrodes COM1 to COMn may act as the common electrode during the pixel array driving period T1. To this end, the touch electrodes COM1 to COMn may be connected to a selection circuit (not shown), which may be connected to the common voltage source and the touch driving circuit 300.

The touch driving circuit 300 may be disabled during the pixel array driving period T1, and during the touch screen driving period T2, the touch driving circuit 300 may be enabled. Therefore, during only the touch screen driving period T2, the touch driving circuit 300 may simultaneously supply the touch electrode driving signal to the sensing lines S1 to Sn.

Figure 5:
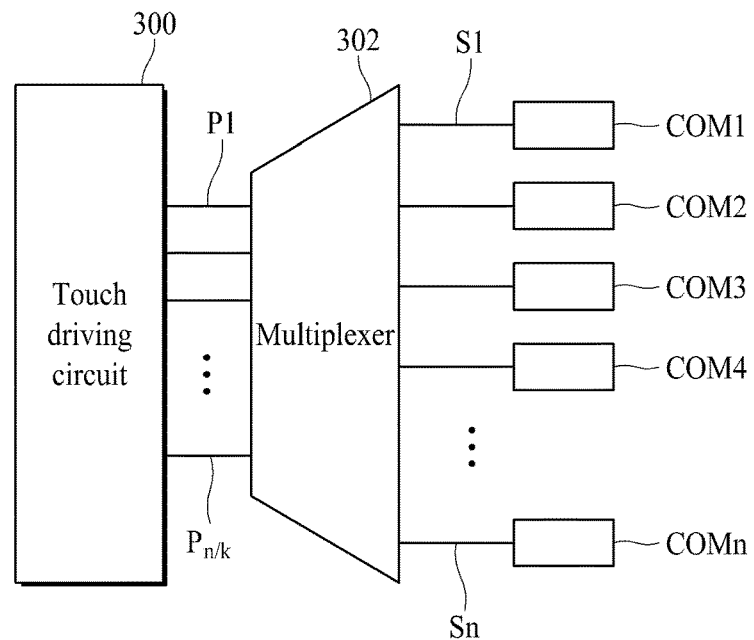
FIG. 5 is a diagram illustrating a modification example of the touch screen illustrated in FIG. 4A.
Figure 6:
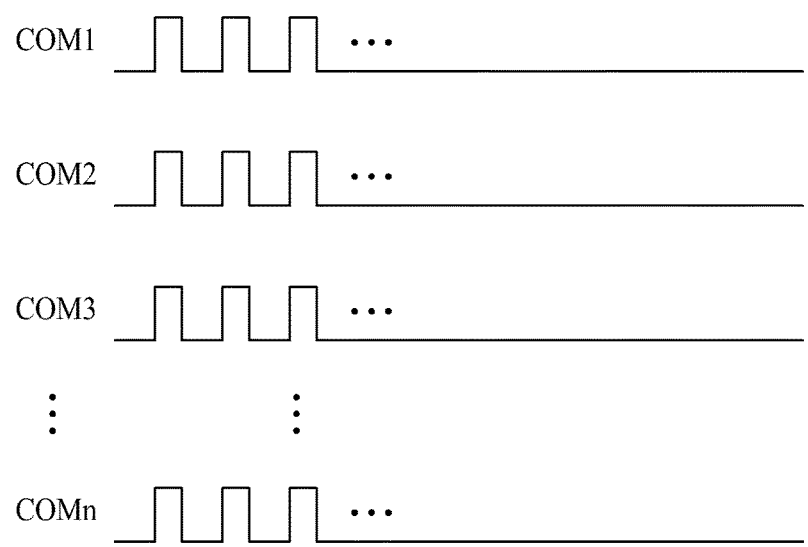
FIG. 6 is a waveform diagram showing a touch electrode driving signal supplied to a touch detection electrode of the touch screen illustrated in FIG. 5.

FIG. 5 is a diagram illustrating a modification example of the touch screen illustrated in FIG. 4A, and FIG. 6 is a waveform diagram showing a touch electrode driving signal supplied to a touch detection electrode of the touch screen illustrated in FIG. 5.

In a self-capacitive touch screen TSP, as illustrated in FIG. 5, in order to reduce the number of signal application lines connected to the touch driving circuit 300, a multiplexer 302 may be further connected to input terminals of the touch electrodes COM1 to COMn, and a signal may be applied to the sensing lines S1 to Sn through time division. The multiplexer 302 may be provided as one or in plurality. For example, if the multiplexer 302 is a 1:k (where k is a natural number which is equal to or larger than two and is smaller than n) multiplexer, the multiplexer 302 may be connected to the touch driving circuit 300 through n/k number of signal application lines. In this case, as illustrated in FIG. 6, the n touch electrodes COM1 to COMn may be grouped in units of k touch electrodes, and k number of touch electrodes may receive k number of time-divided touch electrode driving signals Ts.

Figure 7:
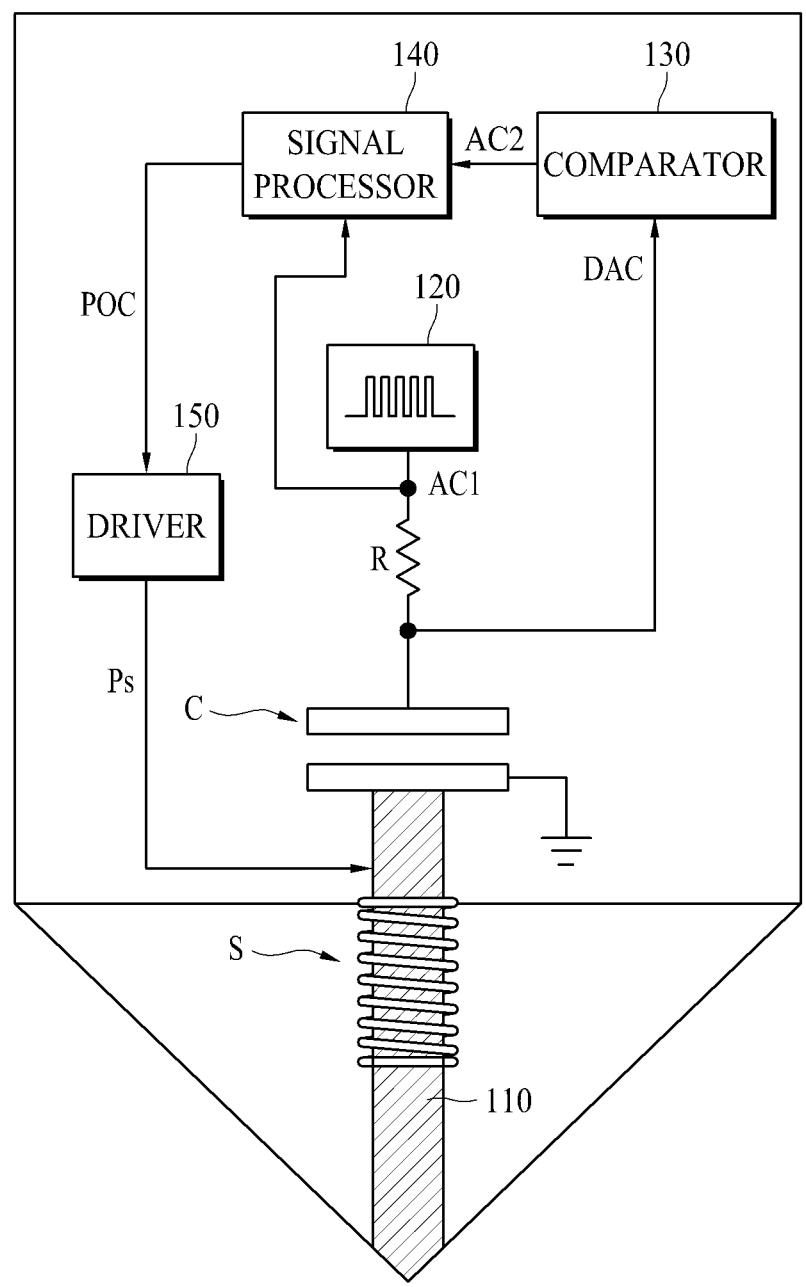
FIG. 7 is a block diagram illustrating an internal structure of a touch pen according to an embodiment of the present invention.

FIG. 7 is a block diagram illustrating an internal structure of a touch pen according to an embodiment of the present invention. FIG. 8 is a diagram showing driving waveforms of the touch pen illustrated in FIG. 7.

Referring to FIG. 7, a touch pen used as a touch input device according to an embodiment of the present invention may include a conductive tip 110, an alternating current (AC) signal generator 120, a delayer, a comparator 130, a signal processor 140, and a driver 150. The touch pen, the touch input device, may transmit a pen output signal Ps to a touch screen. Particularly, the touch pen according to an embodiment of the present invention may adjust the pen output signal Ps according to pressure which is applied to the touch pen when the touch pen contacts the touch screen, thereby transmitting, to the touch screen, pressure information as well as a touch input.

The conductive tip 110 may be formed of a conductive material such as metal and/or the like. The conductive tip 110 may transmit the pen output signal Ps to a closest touch electrode COMx when the conductive tip 110 contacts the display panel 200.

The display panel 200 may include a polarizer or a passivation layer, which is disposed on an uppermost side. The polarizer or the passivation layer may function as an insulation layer to generate a sensing capacitance Csen between the conductive tip 110 and the touch electrode. When the conductive tip 110 contacts the display panel 200, the conductive tip 110 may change the sensing capacitance Csen which is constant on a corresponding touch electrode, and the touch driving circuit 300 may read a change in a value of the sensing capacitance Csen to detect a touched position.

Figure 8:
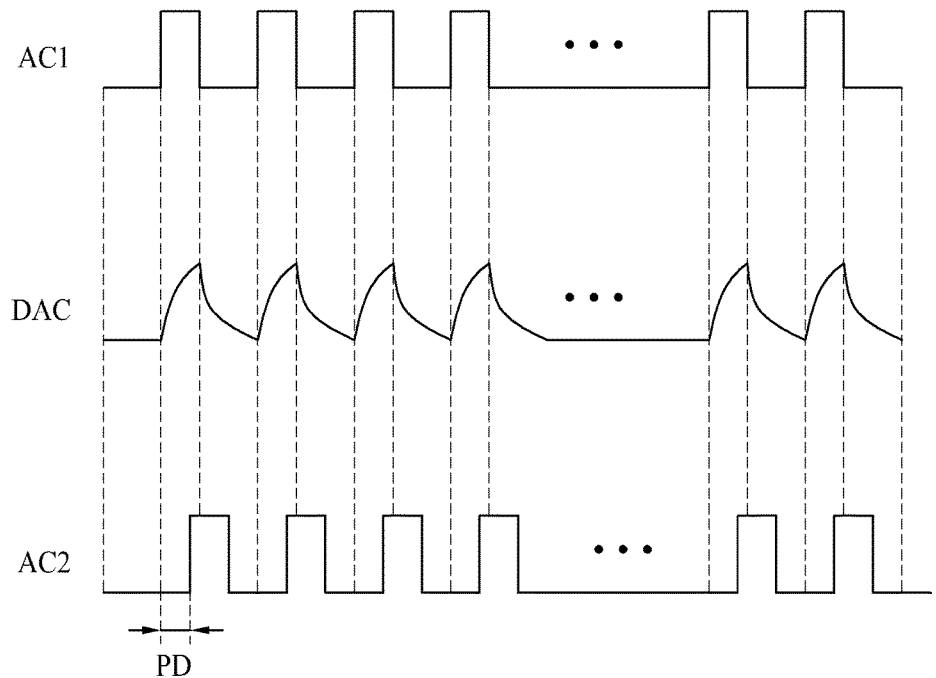
FIG. 8 is a diagram showing driving waveforms of the touch pen illustrated in FIG. 7.

The AC signal generator 120, as shown in FIG. 8, may generate and output a first AC signal AC1. The first AC signal AC1 may act as a reference signal for sensing external pressure applied to the conductive tip 110.

The delayer may delay the first AC signal AC1 output from the AC signal generator 120. To this end, the delayer may include a capacitor C, a spring S disposed between the conductive tip 110 and the capacitor C, and a resistor R which is connected to the capacitor C at one side of the resistor R and receives the first AC signal AC1 through the other side.

The capacitor C may be connected to the conductive tip 110 through the spring S. A capacitance of the capacitor C may vary according to movement of the conductive tip 110 which is made by pressure when the touch pen contacts the touch screen. Therefore, the delayer may delay the first AC signal AC1 according to a capacitance of the capacitor C and a time constant of the resistor R which vary according to pressure when the touch pen contacts the touch screen, thereby generating a first AC signal DC.

The comparator 130 may compare a reference voltage with the first AC signal DC generated by the delayer to output a second AC signal AC2. Here, the second AC signal AC2 may be generated by delaying a phase of the first AC signal AC1 during a certain period, and a degree to which the phase is delayed may be determined based on a capacitance value of the capacitor C.

The signal processor 140 may receive the first AC signals AC1 and AC2. Also, the signal processor 140 may output a pen output variable signal POC for adjusting the pen output signal Ps according to a comparison result obtained by comparing the first AC signals AC1 and AC2. In detail, the signal processor 140 may analyze a phase, by which the second AC signal AC2 is delayed, based on the first AC signal AC1 to sense pressure applied to the touch pen. Also, the signal processor 140 may generate the pen output variable signal POC corresponding to the sensed pressure and may supply the pen output variable signal POC to the driver 150.

The driver 150 may generate the pen output signal Ps consisting of a plurality of pulses and may supply the pen output signal Ps to the conductive tip 110. A frequency of the pen output signal Ps may be previously set in the driver 150. The frequency of the pen output signal Ps may be set identically to a touch electrode driving signal of the touch screen. The driver 150 may synchronize the pen output signal Ps with the touch electrode driving signal according to control by the signal processor 140. In this case, the signal processor 140 may sense the touch electrode driving signal of the touch screen through the conductive tip 110 and then may analyze the sensed touch electrode driving signal to determine an output time of the pen output signal Ps.

The driver 150 may adjust amplitude of the pen output signal Ps, generated from the pen output variable signal POC supplied from the signal processor 140, at every specific period to transmit pressure information based on the touch pen to the touch screen. The specific period may be at least one sub-frame unit. However, the specific period being the sub-frame unit is merely an example, and the specific period may be variously set.

Figure 9:
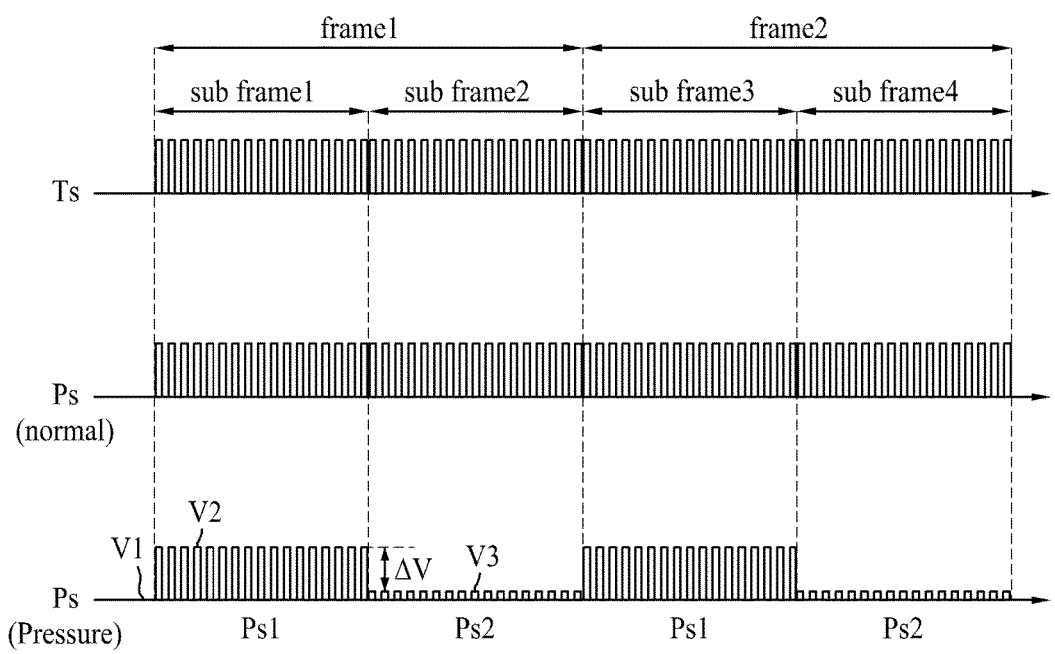
FIG. 9 is a diagram showing output waveforms of a driver illustrated in FIG. 7.

FIG. 9 is a diagram showing output waveforms of the driver 150 illustrated in FIG. 7.

Hereinafter, the pen output signal Ps, which varies according to pressure applied to the touch pen, will be described in detail with reference to FIG. 9.

The pen output signal Ps may consist of a plurality of pulses which swing between specific voltage levels in a normal state where pressure is not applied to the touch pen. For example, when pressure is applied to the touch pen while a user is using the touch pen, the signal processor 140 may sense the pressure through the delayer and the comparator 130 and may output the pen output variable signal POC based on the sensed pressure. The driver 150 may adjust amplitude of the pen output signal Ps at every specific period in response to the pen output variable signal POC.

For example, in an amplitude variable period of the pen output signal Ps, if one frame period is divided into a first sub-frame period and a second sub-frame period, the amplitude of the pen output signal Ps may vary in units of at least one sub-frame. That is, in the first sub-frame period and a third sub-frame period, the amplitude of the pen output signal Ps may be fixed identically to amplitude in the normal state, and in the second sub-frame period and a fourth sub-frame period, the amplitude of the pen output signal Ps may vary according to sensed pressure.

Therefore, in transmitting pressure information based on the touch pen, a varying pen output signal Ps may be defined as follows. That is, the varying pen output signal Ps may include a first pen output signal Ps1, consisting of N number of pulses where a first voltage V1 and a second voltage V2 higher than the first voltage V1 are alternately repeated, and a second pen output signal Ps2 consisting of N number of pulses where the first voltage V1 and a third voltage V3 are alternately repeated. The driver 150 may output the first pen output signal Ps1 in the first and third sub-frame periods and may output the second pen output signal Ps2 in the second and fourth sub-frame periods. In this case, the driver 150 may adjust the third voltage V3 according to the pen output variable signal POC. The third voltage V3 may be set to a value between the first voltage V1 and the second voltage V2. That is, the driver 150 may adjust the third voltage V3 within a range from the first voltage V1 to the second voltage V2 according to the pen output variable signal POC.

The touch screen may sense the pen output signal Ps transmitted from the touch pen and may calculate a voltage difference "ΔV" between the first pen output signal Ps1 and the second pen output signal Ps2 to sense pressure information based on the touch pen.

As described above, according to the embodiments of the present invention, the conductive tip may be used as an element for transmitting a pen output signal which is generated in the touch pen. Also, the touch pen according to an embodiment of the present invention may transmit pressure information based on the touch pen even without using a separate wireless communication module, and the touch screen may receive the pressure information based on the touch pen even without using a separate electrode and sensor. Accordingly, a structure is simple, and the manufacturing cost is reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch screen device comprising:
   a touch screen; and
   a touch pen transmitting a plurality of pen output signals to the touch screen,
   wherein the touch pen adjusts the pen output signals according to pressure applied thereto when the touch pen contacts the touch screen,
   during a touch screen driving period, the touch pen outputs the pen output signal in synchronization with a touch electrode driving signal of the touch screen, the touch electrode driving signal being supplied for detecting a position of a touch input,
   the touch pen output signal includes a first pen output signal and a second pen output signal,
   the first pen output signal includes N number of pulses where a first voltage and a second voltage higher than the first voltage are repeated;
   the second pen output signal includes N number of pulses where the first voltage and a third voltage are repeated,
   the third voltage is adjusted within a range from the first voltage to the second voltage according to the pressure, and
   the touch screen senses pressure information according to a voltage difference between the second voltage and the third voltage, and
   the touch pen comprises:
   an alternating current (AC) signal generator outputting a first AC signal;
   a delayer delaying the first AC signal;
   a comparator comparing the delayed first AC signal with a reference voltage to output a second AC signal; and
   a signal processor outputting a pen output variable signal for adjusting the pen output signals according to a comparison result obtained by comparing phases of the first and second AC signals.

2. The touch screen device of claim 1, wherein the touch pen comprises:
a conductive tip, wherein a portion of the conductive tip protrudes to one side of a housing.

3. The touch screen device of claim 2, wherein the delayer comprises:
a capacitor;
a spring disposed between the conductive tip and the capacitor; and
a resistor connected to the capacitor at one side of the resistor, the resistor receiving the first AC signal through the other side.

4. The touch screen device of claim 2, wherein
the touch pen further comprises a driver supplying a pen output signal including a plurality of pulses to the conductive tip, and
the driver adjusts amplitude of the pen output signals at every specific period in response to the pen output variable signal.

5. The touch screen device of claim 4, wherein the amplitude adjusted pen output signals comprises:
the first pen output signal; and
the second pen output signal.

6. The touch screen device of claim 5, wherein the driver adjusts the third voltage according to the pen output variable signal.

7. The touch screen device of claim 5, wherein the driver outputs the first pen output signal in an odd-numbered sub-frame period and outputs the second pen output signal in an even-numbered sub-frame period.

* * * * *